Dec. 22, 1953  B. R. DAHLBERG  2,663,030
INVALID LIFT AND TRANSFER DEVICE

Filed April 25, 1949  7 Sheets-Sheet 1

INVENTOR
BENGT RUDOLF DAHLBERG
BY *Toulmin & Toulmin*
ATTORNEYS

Dec. 22, 1953     B. R. DAHLBERG     2,663,030
INVALID LIFT AND TRANSFER DEVICE
Filed April 25, 1949     7 Sheets-Sheet 2

INVENTOR
BENGT RUDOLF DAHLBERG
BY Toulmin & Toulmin
ATTORNEYS

Dec. 22, 1953　　　　　B. R. DAHLBERG　　　　　2,663,030
INVALID LIFT AND TRANSFER DEVICE
Filed April 25, 1949　　　　　　　　　　　　7 Sheets-Sheet 3

INVENTOR
BENGT RUDOLF DAHLBERG
BY  *Toulmin & Toulmin*
ATTORNEYS

Dec. 22, 1953   B. R. DAHLBERG   2,663,030
INVALID LIFT AND TRANSFER DEVICE
Filed April 25, 1949   7 Sheets-Sheet 4

Fig. 11

INVENTOR
BENGT RUDOLF DAHLBERG
BY
*Toulmin & Toulmin*
ATTORNEYS

Dec. 22, 1953 B. R. DAHLBERG 2,663,030
INVALID LIFT AND TRANSFER DEVICE
Filed April 25, 1949 7 Sheets-Sheet 5

Fig.12

INVENTOR
BENGT RUDOLF DAHLBERG
BY Toulmin & Toulmin
ATTORNEYS

Dec. 22, 1953 B. R. DAHLBERG 2,663,030
INVALID LIFT AND TRANSFER DEVICE
Filed April 25, 1949 7 Sheets-Sheet 6

INVENTOR
BENGT RUDOLF DAHLBERG
BY Toulmin & Toulmin
ATTORNEYS

Dec. 22, 1953  B. R. DAHLBERG  2,663,030
INVALID LIFT AND TRANSFER DEVICE

Filed April 25, 1949  7 Sheets-Sheet 7

Fig. 15

INVENTOR
BENGT RUDOLF DAHLBERG
BY Toulmin & Toulmin
ATTORNEY

Patented Dec. 22, 1953

2,663,030

UNITED STATES PATENT OFFICE 2,663,030

INVALID LIFT AND TRANSFER DEVICE

Bengt Rudolf Dahlberg, Bredbyn, Sweden, assignor to J. R. Andersson & Co. A B, Sundbyberg, Sweden, a limited-liability company of Sweden Application April 25, 1949, Serial No. 89,382

Claims priority, application Sweden April 26, 1948

15 Claims. (Cl. 5—86)

The present invention relates to an apparatus for lifting, temporarily supporting and transferring sick persons which are confined to their beds, and it relates more particularly to such apparatus of this kind which comprise a number of supporting members adapted to be individually inserted underneath the patient and a gripping mechanism for such supporting members which is adapted to be raised and lowered on a movable stand.

It is a primary object of the invention to provide an apparatus of the kind set forth in which the supporting members are so shaped in the form of comparatively narrow bars as to be readily insertable underneath the patient with a minimum of effort on the part of the nurse and with the least possible disturbance of the patient.

It is a further object of the invention to provide a movable lifting apparatus in which the supporting members are adapted to be inserted underneath the patient in arbitrary mutual positions and are adapted to be held in the gripping mechanism of the lifting unit at arbitrary mutual distances.

Still another object of the invention is to provide one of the supporting members with a broader supporting surface than the other supporting members in order to provide for a satisfactory support for the head of the patient.

It is a further object of the invention to design the gripping mechanism for the supporting members so that the supporting members, even if they take up different level positions under the patient and/or different inclinations with respect to each other, may be simultaneously clamped in the gripping mechanism on actuation of a single operating member for the latter.

The invention has also for its object to design the lifting means for the gripping mechanism so as to be readily operated by a single person.

Other objects of the invention will be readily understood from the following detailed description with reference to the accompanying drawings.

Figure 1:
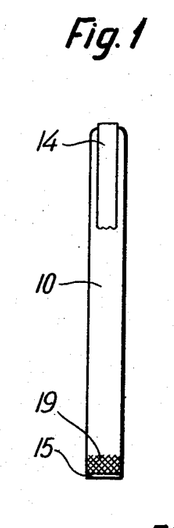
Figures 1, 2 and 3 show a supporting bar according to a first embodiment in top view, side view and bottom view respectively.
Figure 2:
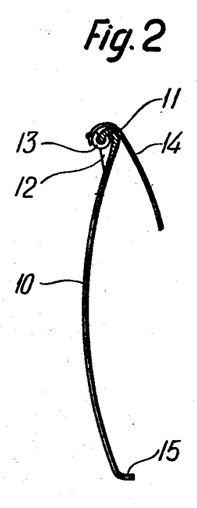
Figure 3:
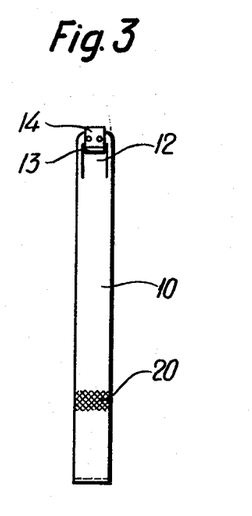
Figure 4:
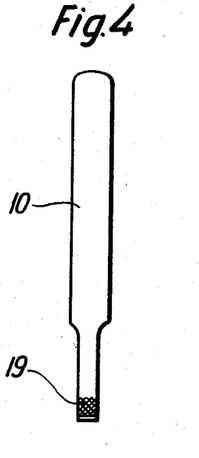
Figures 4 and 5 respectively show in top view and side view a supporting bar according to a second embodiment.
Figure 5:
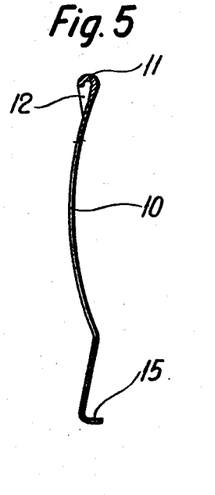

According to the invention the supporting members for the patient consist of a plurality of slightly bent bars 10, preferably of steel or other resilient material, which at their leading ends are provided with a head portion 11 which is so shaped that the bars may be inserted underneath the patient with a minimum of effort and with a minimum of disturbance to the patient. In side view the head 11 may have substantially the shape of an ellipse having a slightly bent major axis. Provided in the underside of the head portion of the bar is a recess 12 in which a hook 13 on a fastening strap 14 may be secured. The bars 10 may be made with the same width along their entire length, as shown in Figures 1 to 3, or alternatively they may be narrower at their engaging end, as shown in Figures 4 and 5. At its gripping end each bar may be provided with a bent-up portion 15, which is intended to prevent the bar from being pulled out of the gripping mechanism when in its gripped position. A suitable width of the supporting surface, which if desired may be provided with a heat insulating covering, is about five inches, whereas a suitable length of the bar is about four feet.

Figure 6:
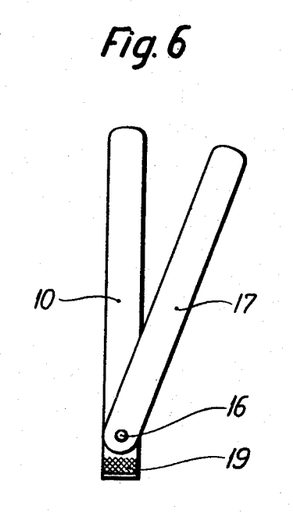
Figure 6 is a top view of a supporting bar adapted to serve as a support for the head of the patient.
Figure 7:
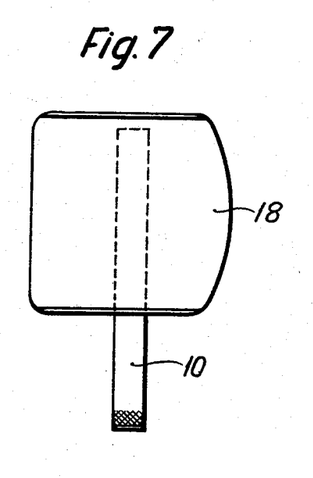
Figures 7 and 8 show a modified head support in top view and side view respectively.
Figure 8:
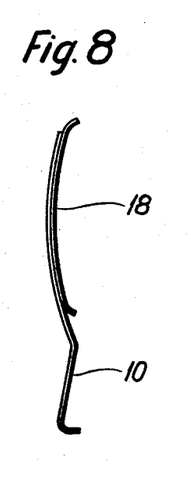

With the supporting bar 10 shown in Figure 6 is, by means of a pin 16, pivotally connected an auxiliary bar 17, which may be swung towards one side, so that a configuration similar to a pair of scissors is formed which presents a widened supporting surface for the head of the patient. Alternatively, there may be secured on the supporting bar 10 in accordance with Figures 7 and 8, a curved plate 18 which may be inserted under the head of the patient from the end of the bed.

In order that the gripping mechanism shall obtain a better grip on the supporting members, the latter are serrated at their gripping end, as indicated at 19 and 20.

Figure 9:
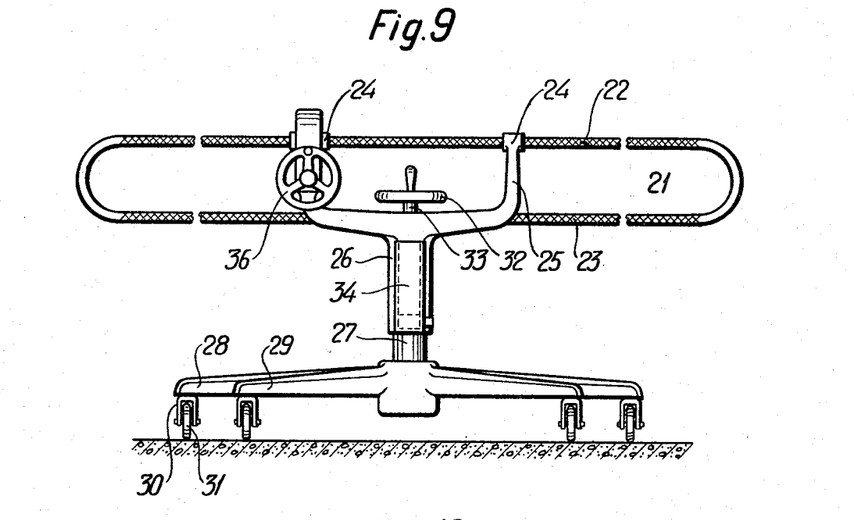
Figures 9 and 10 show a first embodiment of the lifting unit in front view and side view respectively.
Figure 10:
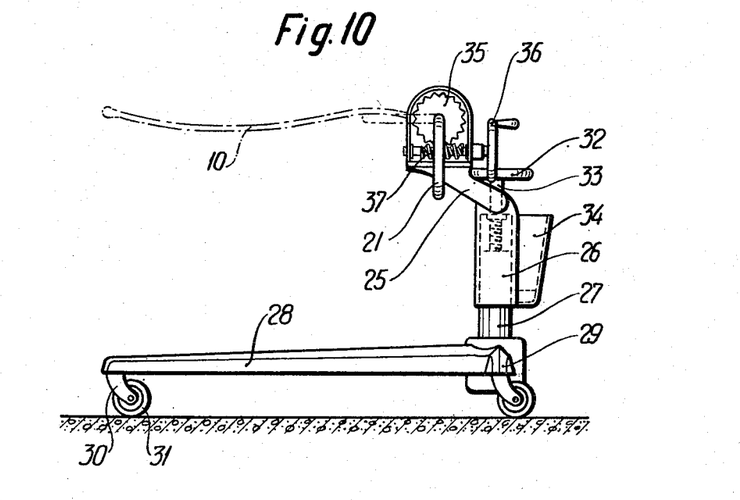

In the embodiment of the lifting unit shown in Figures 9 and 10 the gripping mechanism for the supporting bars comprises a substantially rectangular metal tube frame 21, between the longitudinal sides 22 and 23 of which the supporting bars 10 are intended to be clamped. The gripping surfaces of said longitudinal sides of the frame are provided with serrated or otherwise uneven gripping surfaces. One longitudinal side 22 of the frame is journalled in a horizontal position in bearing sleeves 24 provided at the free ends of two arms 25 which are rigidly secured to a hollow cylinder 26. Said cylinder is movable with a sliding fit along a vertical column 27 provided with a base consisting of four arms 28 and 29 which extend from the lower end of the column. The arms 28 are considerably longer than the arms 29. At the end of each arm is provided a fork 30 which is turnable about a vertical pin, and in each of said forks is journalled a wheel 31, so that the lifting unit may be rolled along the floor in every desired direction.

The means for moving the cylinder or guide sleeve 26 along the column 27 comprise in the embodiment shown a screw 33 provided with an operating wheel 32, said screw cooperating with a screw thread in an axial bore in the sleeve body and resting with its lower end on the top of the column 27.

Supported on the column is an electrically heated basket 34 in which the supporting bars are intended to be housed when not in use.

For the purpose of swinging the frame 21 from its inoperative position shown with full lines in Figures 9 and 10 to its gripping position shown with dot-and-dash lines in the same figures, there is fixedly secured on the rod 22 of the frame a worm wheel 35 which may be turned by means of a worm 37, said worm being journalled in the arm 25 and provided with a hand wheel 36. The turning of the frame may, of course, be effected alternatively by means of some other turning mechanism, e. g. a hydraulically operated mechanism.

Figure 11:
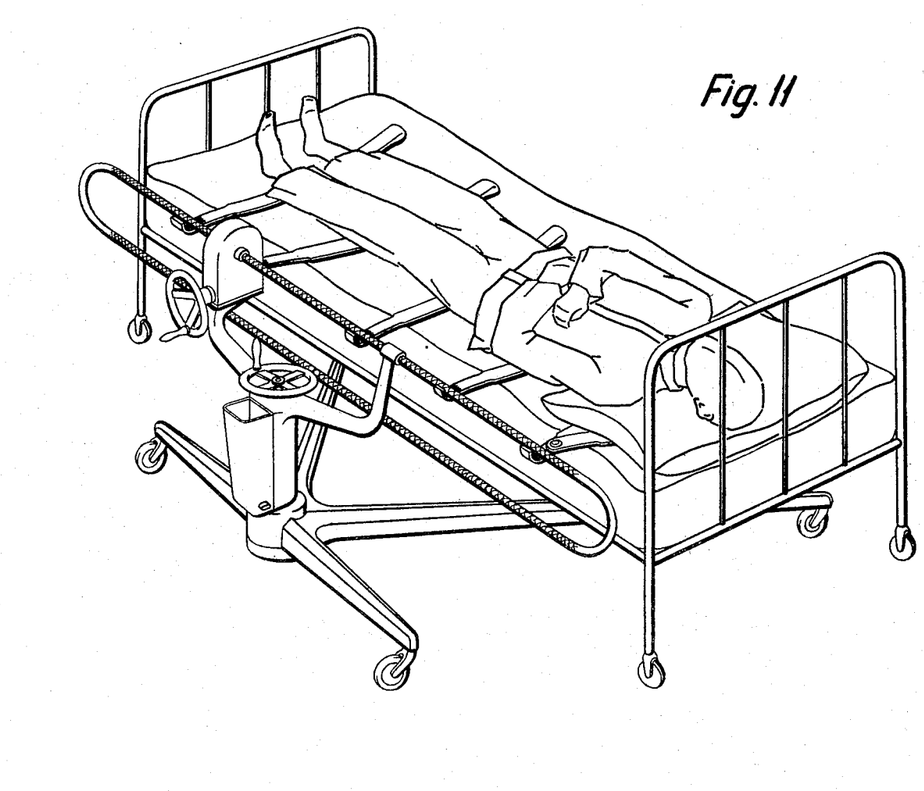
Figure 11 is a perspective showing the supporting bars in inserted position underneath the patient and the lifting unit in position for gripping the supporting members.
Figure 12:
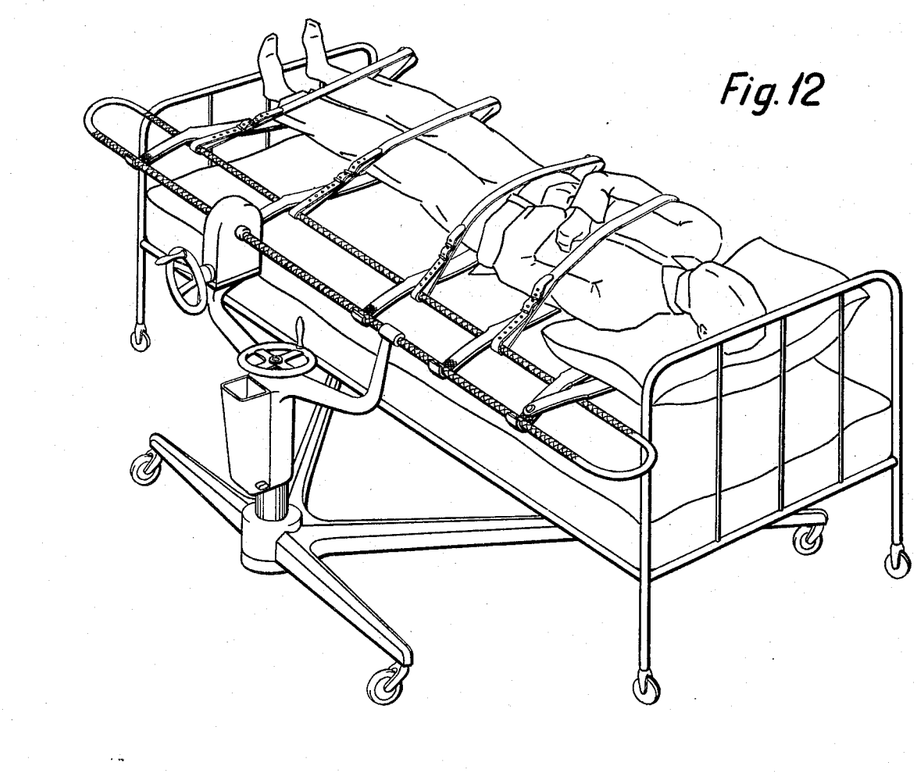
Figure 12 is a perspective showing the apparatus with the patient supported in an elevated position.

When the patient is to be lifted by means of the apparatus described above, a number of supporting bars 10 having a comparatively narrow supporting surface are inserted from the side of the bed in suitable positions underneath the patient, whereas a single supporting member having a wider supporting surface, e. g. one of the kind shown in Figure 6, is placed under the head of the patient (compare Figure 11). The lifting unit is then moved to the side of the bed with its gripping frame 21 in the vertical starting position, whereafter, by turning the hand wheel 32, the gripping mechanism is moved to such an elevation that the mutually parallel rods 22 and 23 of the frame will occupy a higher and a lower position respectively than the engaging ends of the supporting bars 10 which project over the edge of the bed. The unit is then rolled closer to the bed until the engaging ends of the bars project into the frame 21, whereupon the latter is lowered by turning the hand wheel 32 until the upper rod 22 engages with the upper side of at least some of the supporting bars 10, as shown in Figure 11. Hereafter the frame is swung up to its horizontal position by turning the hand wheel 36, all the supporting bars 10 being then supported by the rod 23 from below a short distance inside of their ends, so that they are held by the frame in a substantially horizontal position clamped in a cantilever fashion between the bars 22 and 23. Hereafter the entire gripping mechanism together with the supporting bars clamped therein and the patient resting on the supporting bars is elevated by displacing the sleeve 26 along the column by turning of the hand wheel 32, until the patient has been lifted entirely free from the bed, as shown in Figure 12. After the patient has been strapped to the lifting unit by means of the straps 14 secured in the recesses 12 on the underside of the free ends of the supporting bars 10, the entire lifting apparatus together with the supported patient may be rolled away from the bed.

If it is desired to move the patient only a short distance, for example within the same room, the transport may be effected by means of the movable lifting apparatus, but on longer transports, for instance to an operating room, it may be preferable first to transfer the patient to an ordinary movable stretcher. If it is only desired to change the bed the apparatus may, of course, be left standing alongside the bed until the bed has been changed.

When the patient is to be restored to his bed the above described operations have to be performed in the reverse order of sequence.

Figure 13:
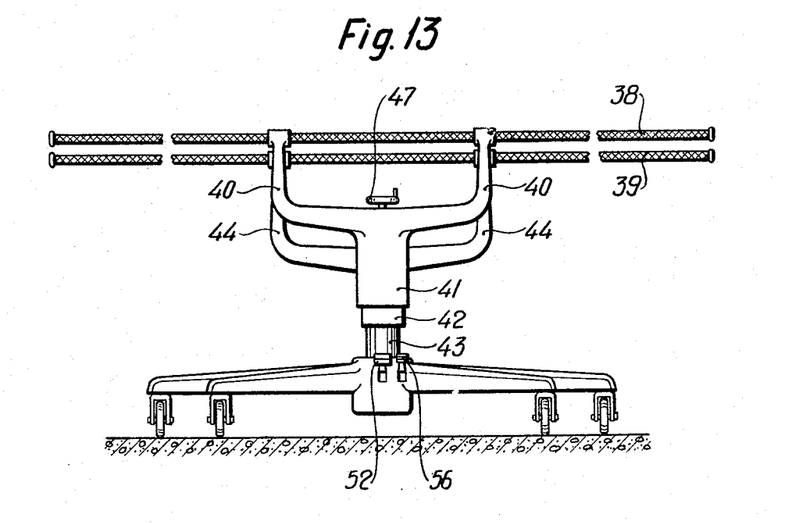
Figures 13 and 14 show a second embodiment of the lifting unit in front view and side view.
Figure 14:
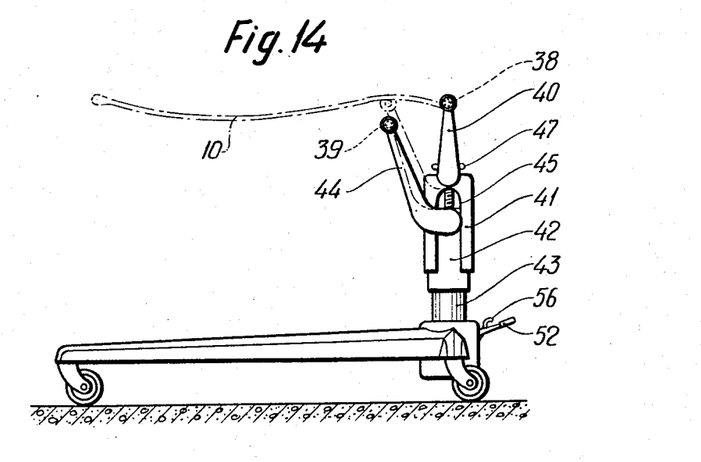
Figure 15:
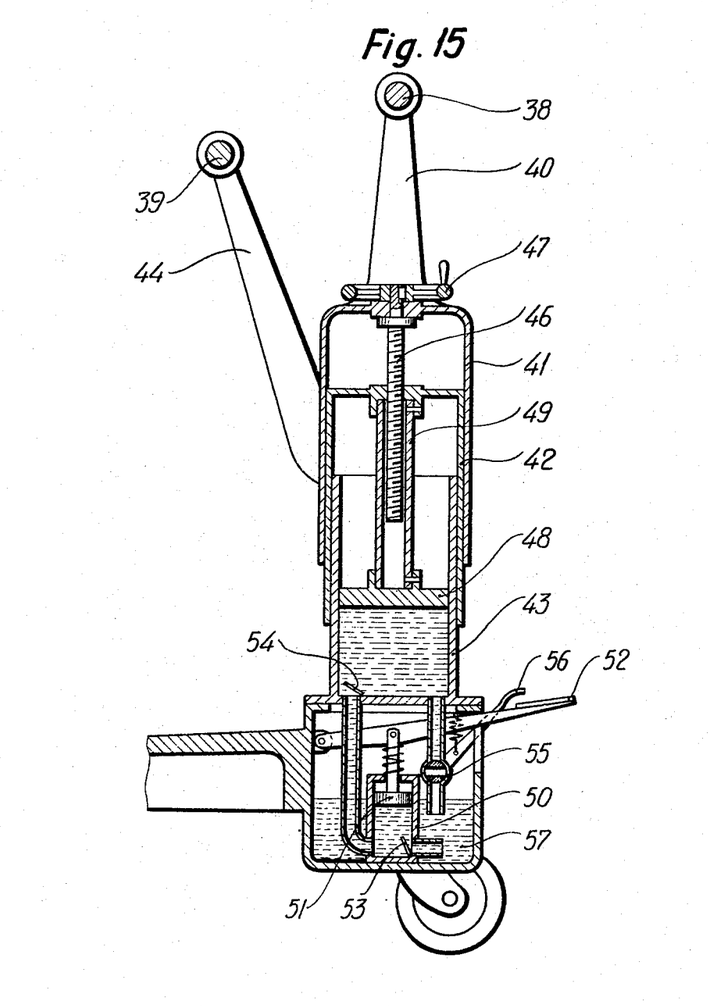
Figure 15 shows on a larger scale a vertical section through the column of the lifting unit according to Figures 13 and 14.

In the embodiment of the lifting unit shown in Figures 13 to 15 the gripping members for the supporting bars 10 consist of two horizontal mutually parallel rods 38 and 39 which are vertically displaceable with respect to each other in two spaced vertical planes, viz. from an inoperative position in which the rods are on different levels to a gripping position substantially on the same level. The rod 38 is supported by two arms 40 on an outer sleeve 41 which is slideable on an inner sleeve 42, the latter being in turn slideable on the column 43 of the movable stand. Two arms 44, which support the rod 39, are secured to the inner sleeve 42 and extend through axial slots 45 in the outer sleeve 41. A screw 46 is turnably but not displaceably journalled in the outer sleeve 41 and cooperates with a screw thread in the inner sleeve 42. By turning an operating wheel 47 provided on the screw 46 the sleeves 41 and 42 and thus also the gripping bars 38 and 39 may be set at desired levels with respect to each other.

For raising and lowering the gripping mechanism on the column 43 there is provided a hydraulic lifting mechanism. Said mechanism consists of the lifting plunger 48, which is slidable in the cylinder-shaped column 43 and is coupled with the inner sleeve 42 by means of a pipe 49 which surrounds the screw 46, and of the pump plunger 51 which is slidable in the cylinder 50 and is adapted to be operated by means of a pedal 52. The reference numerals 53 and 54 designate two non-return valves, and the reference numeral 55 a valve which is adapted to be opened by means of a pedal 56. On the opening of the valve 55 the oil pumped into the cylinder 43 will flow back to the sump 57, permitting the lifting mechanism to slide down along the column 43.

When using the lifting unit according to Figures 13 to 15 the supporting bars 10 are first clamped between the gripping rods 38 and 39 by elevating the rod 39, by pumping fluid into cylinder 43 to the position shown with dot-and-dash lines in Figure 14, and then lowering rod 38 by turning handwheel 47. The nurse or other attendant thereafter again pumps oil into the plunger cylinder 43 by means of the pedal 52.

the plunger 48 and the entire gripping mechanism supported thereby being then elevated until the patient has been lifted free from the bed. In other respects said lifting unit operates in the same manner as the lifting unit shown in Figures 9 and 10.

It should be particularly noted that the embodiments of the invention illustrated on the drawings and described above in detail are only intended to explain the invention and not to limit the same in any way. The invention is capable of many modified realizations and comprises inter alia all equivalents.

I claim:

1. An apparatus for handling recumbent persons, comprising; a plurality of substantially flat, relatively narrow and long supporting elements adapted for being individually introduced beneath the body of the recumbent person at arbitrary relative distances, a base, a support on the base, two parallel substantially horizontal gripping rods extending substantially the length of a bed, supporting means on said support supporting said gripping rods thereon, said supporting means being adjustable vertically relative to each other causing the said gripping rods to engage the free ends of the plurality of supporting elements when inserted in position beneath the recumbent person for gripping and supporting the said supporting elements in a cantilever fashion, and said supporting means also being adjustable vertically on said support in unison to lift the pair of gripping rods in gripping position with respect to said support while holding the said gripping rods horizontal in all lifted positions thereof.

2. An apparatus for handling recumbent persons, comprising; a base, a supporting column on said base, two parallel substantially horizontal supporting members in horizontally spaced relation adjacent said column substantially the length of a bed, means supporting said supporting members on the said column in vertical adjustability relative to each other and holding said supporting members horizontal in all adjusted positions thereof, a plurality of substantially flat, relatively narrow and long supporting elements having their one ends beneath the one of said supporting members that is closest to said column and on top of the other thereof, whereby said supporting members can be brought into supporting engagement with said elements, with the said one of the supporting members engaging the elements on top thereof and the other engaging the said elements on the underneath side whereby said elements are supported in cantilever fashion, said supporting members being adjustable in unison vertically of said column, and said supporting members being substantially unobstructed over their entire length, whereby there can be substantially any desired relative distance between said supporting elements, said supporting elements being adapted for being individually introduced beneath the body of the recumbent person.

3. An arrangement as set forth in claim 2 wherein the supporting elements are slightly concave upwardly.

4. An arrangement as set forth in claim 3 in which the said supporting members are rods and each of the said supporting elements comprises at least one transverse recess therein in the region of one of said rods and concave toward the adjacent rod, whereby said elements are prevented from shifting in the direction of their length relative to the rods.

5. An arrangement as set forth in claim 4 in which at least one of the engaging surfaces of the recess and adjacent rod is knurled.

6. An apparatus for handling recumbent persons, comprising; a base, a support column on the base, two parallel substantially horizontal rods adjacent said support, said rods being interconnected at their ends to form a rigid loop, means on the column supporting said loop for rotation about the axis of one of said rods comprising bracket means engaging said one of said rods at spaced points therealong, said bracket means being vertically adjustable on said column, a plurality of substantially flat, relatively long and narrow supporting elements extending at right angles to said rods having their one ends under said one rod and extending over the other said rod, and means associated with said bracket means for rotating said loop bodily about the axis of the said one rod, whereby when the said one rod is brought into engagement with the upper surface of the said one end of each of said elements, the loop can then be rotated to bring the other rod up against the underneath surface of each of said elements at points spaced inwardly along the elements from the said one end thereof for supporting said elements in cantilever fashion, said elements being adapted for being individually introduced beneath the recumbent person's body.

7. An arrangement as set forth in claim 6 in which the means rotating the said loop comprises a worm wheel connected with said one rod at one of said bracket means, and a worm gear meshing therewith and journaled on the said one bracket means.

8. An apparatus for handling recumbent persons, comprising; a base, a column on the base, two separate substantially horizontal and parallel gripping rods adjacent the said column, one of said rods being closer to the column than the other thereof, separate bracket means respectively supporting the rods on the column for adjustment of said rods vertically thereon relative to each other while retaining the rods parallel, a plurality of substantially flat, relatively narrow and long supporting elements extending at right angles to said rods having their one ends in alignment and under said one rod and above the other thereof, whereby when the said one rod by vertical adjustment is brought into engagement with the upper surface of each said element at one end thereof, the other rod can be brought into engagement with each said element on the underneath surface thereof at a point spaced inwardly from the said one end by vertical adjustment thereof relatively to said one rod, thereby to support the elements in cantilever fashion, means for moving said bracket means vertically on said column in unison, said elements being adapted for being individually introduced beneath the body of a recumbent person, and said rods being substantially unobstructed over their entire length, whereby any desired spacing between adjacent of said elements can be obtained.

9. An apparatus for handling recumbent persons, comprising; a base, a support upstanding on the base, two horizontal parallel supporting rods adjacent the support, bracket means supporting the rods on the support, one of said rods being closer to the support than the other thereof, adjusting means associated with the support operable to adjust said bracket means relative to each other in the vertical direction, and a plurality of substantially flat, relatively narrow and long supporting elements adapted individually to be introduced beneath a recumbent person's body extending at right angles to said rods with their one ends under the rod nearest to said support and above the rod farther from said support, whereby actuation of said adjusting means can bring the said rods into supporting engagement with said elements, or release the rods from engagement with the elements, whereby said elements are supported in cantilever fashion.

10. An arrangement as set forth in claim 9 in which the support includes means for adjusting said bracket means vertically thereon in unison.

11. An arrangement as set forth in claim 10 in which the said brackets are rotatable in unison about a vertical axis on said support.

12. An apparatus for handling recumbent persons, comprising; a carriage forming a base for the apparatus, a support means upstanding from the carriage, two substantially horizontal rods adjacent said support means spaced from each other horizontally and vertically, a plurality of substantially flat, relatively narrow and long supporting elements adapted individually to be introduced beneath the body of a recumbent person in spaced parallel relation with their outer ends between said rods, a plurality of sleeve means vertically reciprocable on the support means telescopically engaging each other on a vertical axis, bracket means supporting said rods on respectively different ones of said sleeve means, means for adjusting said sleeve means relatively vertically for adjusting the rods relatively in the vertical direction to cause the rods to engage the outer ends of said elements in supporting relation, and means for adjusting the said sleeve means in unison axially of said support means.

13. An arrangement as set forth in claim 12 in which the adjusting means for adjusting the sleeve means relative to each other, comprises screw means extending axially of said sleeve means.

14. An arrangement as set forth in claim 13 in which the means for adjusting said sleeve means in unison on the support means comprises a cylinder formed in said support means, a piston in the cylinder connected to one of said sleeve means, and means for supplying pressure fluid to said cylinder.

15. An apparatus for handling recumbent persons which comprises in combination, a base, supporting means on the base adjustable in height, means associated with said supporting means for adjusting the same in height, a pair of vertically and horizontally spaced substantially horizontally extending supporting rods adjacent the supporting means, bracket means carried by said supporting means individually supporting said rods, a plurality of substantially flat relatively narrow and long supporting elements adapted individually to be introduced beneath a person's body in spaced parallel relation with their outer ends aligned, and means for relatively shifting said bracket means in a vertical direction on said support means thereby causing said rods to grip said supporting elements at one end of each thereof and from different sides so as to hold said supporting elements in cantilever fashion when the rods are positioned one above the said outer ends of said elements and one therebeneath, the rod nearest the support means being on top of the elements and the rod furthest from the support means being beneath the elements, and said rods and bracket means being rotatable on a vertical axis as a unit.

BENGT RUDOLF DAHLBERG.

References Cited in the file of this patent

UNITED STATES PATENTS

| Number | Name | Date |
|---|---|---|
| 312,763 | Rhoads | Feb. 24, 1885 |
| 483,657 | Rhoads | Oct. 4, 1892 |
| 1,857,031 | Schaffer | May 3, 1932 |
| 2,404,734 | Lenahan | July 23, 1946 |
| 2,539,346 | Feist | Jan. 23, 1951 |